(12) United States Patent
Swank et al.

(10) Patent No.: US 8,135,525 B2
(45) Date of Patent: Mar. 13, 2012

(54) TORQUE CONVERTER WITH TURBINE MASS ABSORBER

(75) Inventors: Michael G. Swank, Shreve, OH (US); Patrick Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 796 days.

(21) Appl. No.: 12/291,212

(22) Filed: Nov. 7, 2008

(65) Prior Publication Data

US 2009/0125202 A1     May 14, 2009

Related U.S. Application Data

(60) Provisional application No. 61/003,052, filed on Nov. 14, 2007.

(51) Int. Cl.
*G06F 17/00* (2006.01)
(52) U.S. Cl. ............................................. 701/69; 701/82
(58) Field of Classification Search .................... 701/68, 701/69, 82, 100; 192/3.25–3.28; 180/197
See application file for complete search history.

(56) References Cited

U.S. PATENT DOCUMENTS

| | | | |
|---|---|---|---|
| 6,244,401 B1 | 6/2001 | Maienschein et al. | |
| 7,083,029 B2 | 8/2006 | Seebacher et al. | |
| 7,658,679 B2 * | 2/2010 | Avins et al. | 464/68.1 |

OTHER PUBLICATIONS

U.S. Appl. No. 60/876,317, filed Dec. 21, 2006, Kneidel et al.
Hartog, J.P. Den, "Mechanical Vibrations," Two Degrees of Freedom, Chapter 3.3, pp. 93-106, 1985.

* cited by examiner

*Primary Examiner* — Richard M. Camby
(74) *Attorney, Agent, or Firm* — Simpson & Simpson, PLLC

(57) ABSTRACT

A torque converter having a first damper stage, a second damper stage, a floating flange torsionally connecting the first and second damper stages, an inertia element, and a tuned torsion damper. The torsion damper connects the inertia element and the flange. In a preferred embodiment, the inertia element is a turbine. In one embodiment, the first damper stage is a radially outer damper stage and the second damper stage is a radially inner damper stage. In another embodiment, the torsion damper generates a friction torque when rotated.

22 Claims, 3 Drawing Sheets

TORQUE CONVERTER WITH TURBINE MASS ABSORBER

CROSS-REFERENCE TO RELATED APPLICATIONS

This application claims the benefit under 35 U.S.C. §119(e) of U.S. Provisional Application No. 61/003,052 filed Nov. 14, 2007 which application is incorporated herein by reference.

FIELD OF THE INVENTION

The invention relates generally to torque converters, and more specifically to a torque converter with a turbine configured as a tuned mass absorber.

BACKGROUND OF THE INVENTION

Torque converters generally incorporate a mechanical clutch to bypass the hydrodynamic circuit and improve fuel economy. Often, a torsional isolator is incorporated into the torque converter clutch to reduce transmission of torsional vibrations from the engine to the transmission. Isolator performance is improved when its spring rate is reduced. One way to reduce spring rate is to use multiple sets of springs in a series configuration.

Commonly owned U.S. Pat. No. 6,244,401 (granted Jun. 12, 2001 to Maienschein et al. for "FORCE TRANSMITTING APPARATUS"), herein incorporated by reference, discloses a torque converter with a "series turbine damper" having an input portion engaged with a turbine. The damper has a first damper stage and a second damper stage. In FIG. 2, an intermediate part, or floating flange, represents the output member of the first damper stage and, together with a radially extending flange-like part connected to the intermediate part, holds energy storage devices of the second damper stage.

The floating flange has substantial inertia and its location in the torque path between the sets of concentric springs introduces a degree of freedom (flange mode) that results in objectionable drivetrain vibrations in some vehicles. Maienschein incorporates a plate spring to achieve a desired amount of frictional torque to absorb the flange mode energy. Unfortunately, adding friction degrades isolator performance at all frequencies except the flange mode frequency.

Commonly owned U.S. Pat. No. 7,083,029 (granted Aug. 1, 2006 to Seebacher et al. for "POWER TRANSFER APPARATUS WITH FLUID COUPLING"), herein incorporated by reference, discloses a torque converter having a "double damper" with two damper stages, namely a radially inner stage and a radially outer stage. A runner, or turbine, is rigidly connected to a carrier, which is in turn secured to two discs, or cover plates. The cover plates constitute the input member of the radially inner damper stage.

The mass of the turbine increases the secondary inertia—that is, the inertia positioned after the outer damper stage in the torque path—to oppose engine torsional vibrations and reduce vibrations transmitted to the driveline. Also, adding inertia from the turbine to the cover plates, or floating flange, moves the resonance frequency of the floating flange lower, and out of the driving range in some vehicles. Unfortunately, in other vehicles, the resonance frequency remains in the driving range and results in objectionable drivetrain vibrations.

Thus there is a long-felt need for an improved torque converter design whereby a flange mode is reduced without using friction. There is also a long-felt need for an improved torque converter design whereby transmission of engine torsional vibrations is reduced without introducing objectionable drivetrain vibrations.

BRIEF SUMMARY OF THE INVENTION

The present invention broadly comprises a torque converter having a first damper stage, a second damper stage, a floating flange torsionally connecting the first and second damper stages, an inertia element, and a tuned torsion damper. The torsion damper connects the inertia element and the flange. In a preferred embodiment, the inertia element is a turbine. In one embodiment, the first damper stage is a radially outer damper stage and the second damper stage is a radially inner damper stage. In another embodiment, the torsion damper generates a friction torque when rotated.

In another embodiment, the torsion damper includes an elastic member with a linear zero torque transition. In a further embodiment, the elastic member is a coil spring. In further aspects, the elastic member comprises a torsionally elastic plate. The plate may be rigidly connected to the flange and the turbine. The plate and flange may have axial offsets, with the plate offset less than the flange offset.

In one embodiment, the travel of the torsion damper is between 2 degrees and 20 degrees. In a further embodiment, the travel is between 6 degrees and 10 degrees. In another embodiment, the total rotational travel of the torsion damper is limited by a connection with lash between the inertial element and the flange. In yet another embodiment, the lash connection is a rivet disposed in a slot in the flange or a spline connection.

The present invention also broadly includes a torque converter including: a radially outer first damper stage; a radially inner second damper stage; a floating flange with a first axially offset portion, said flange torsionally connecting said first and second damper stages; a turbine; and a torsionally elastic plate with a linear zero torque transition and a second axially offset portion rigidly connected to said turbine and said flange. The first offset portion is more axially offset than the second offset portion and contact between the first and second offset portions generates a friction torque when said torsion damper is rotated.

The present invention also includes a method of operating a torque converter comprising the steps of: receiving a torque into a first damper stage; transmitting said torque from said first damper stage to a floating flange; transmitting said torque from said floating flange to a second damper stage; and connecting an inertia element to the flange through a tuned torsion damper to suppress a resonance of the flange. In one embodiment, the method includes the step of tuning said torsion damper to reduce a high frequency peak by adjusting a spring rate and a friction of said damper with the flange. In one embodiment the friction is between 5 Nm and 20 Nm or the spring rate is calculated to move a resonance of said inertia element to a point below a lugging limit.

In one embodiment, the inertia element is a turbine of the torque converter. In another embodiment, a total rotational travel of the torsion damper is between 2 degrees and 20 degrees. In a further embodiment, the travel is between 6 degrees and 10 degrees.

It is a general object of the present invention to provide an improved torque converter design whereby a flange mode is reduced. It is also an object of the invention to provide an improved torque converter design whereby transmission of engine torsional vibrations are reduced without introducing objectionable drivetrain vibrations.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural element of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
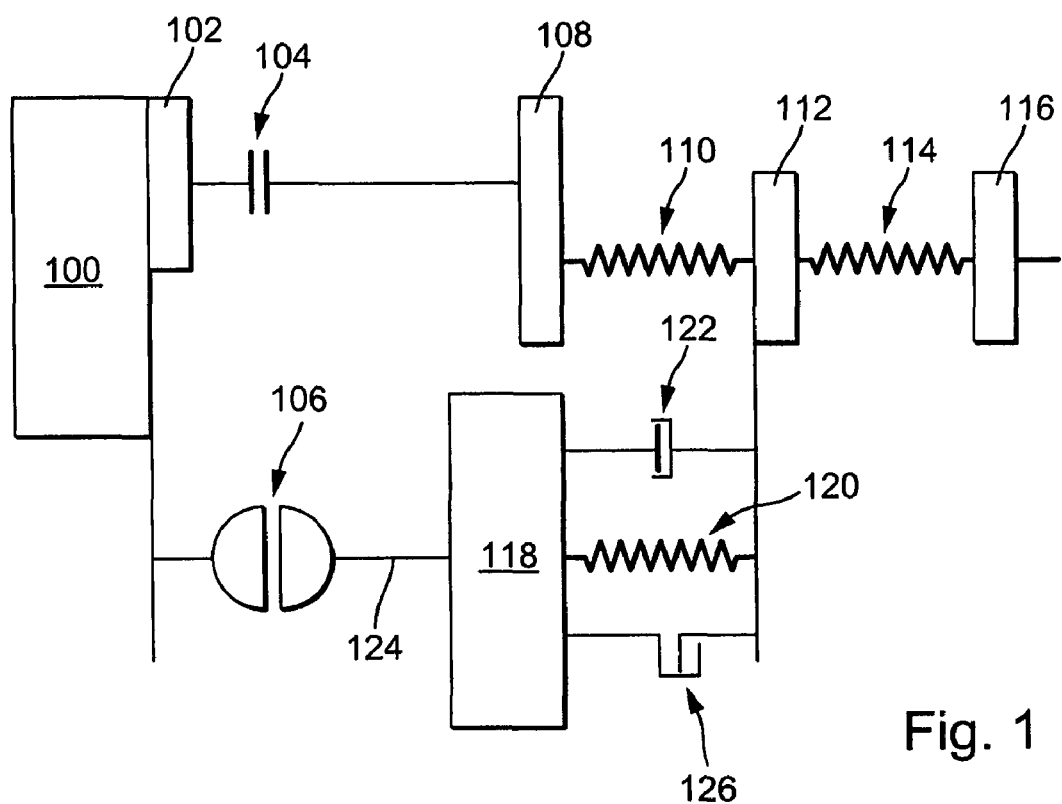
FIG. 1 is a schematic of a present invention damper configuration.

FIG. 1 is a schematic of present invention damper configuration 100.

Figure 2:
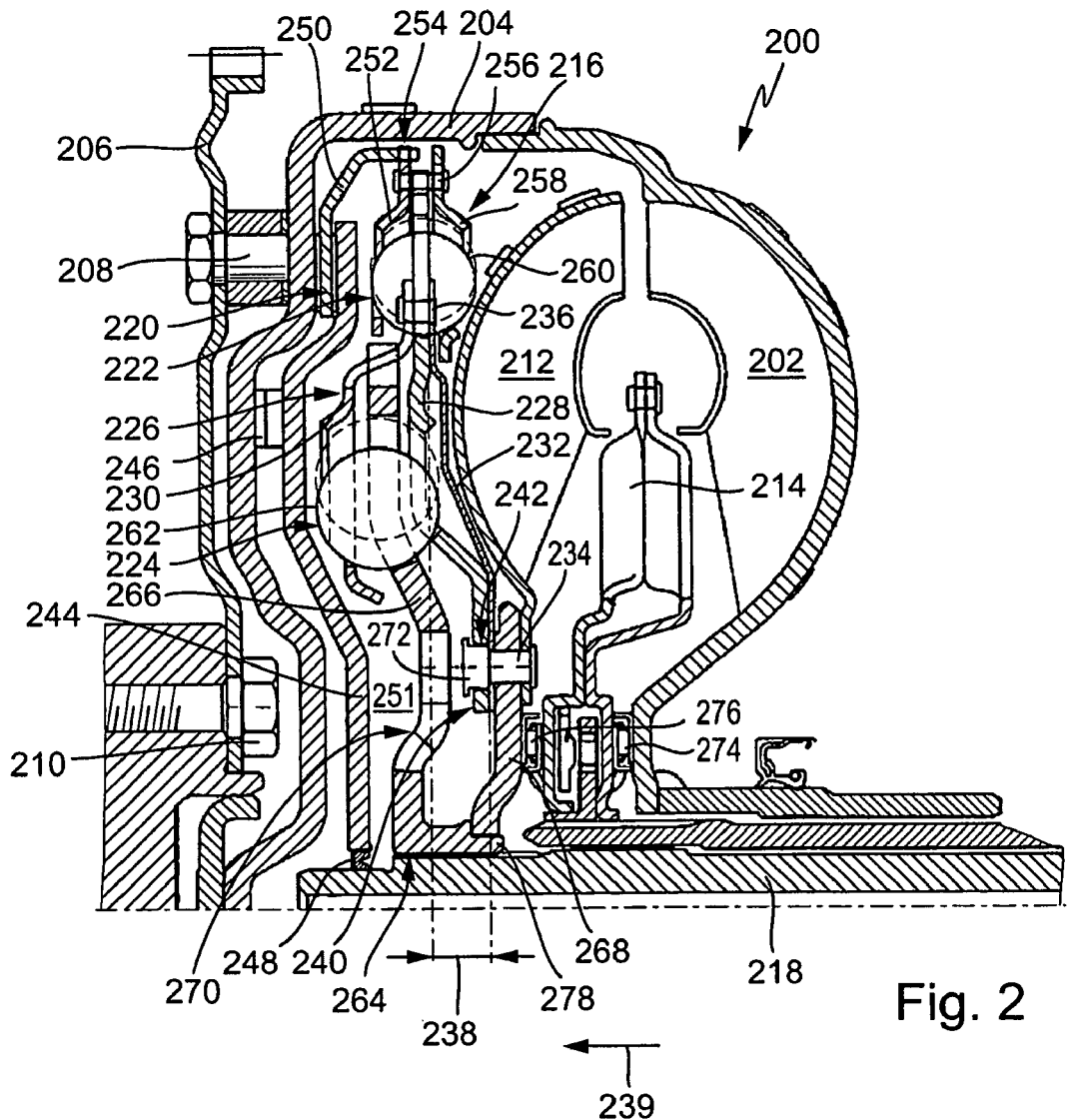
FIG. 2 is a top half of a torque converter cross section depicting an embodiment of the damper configuration in FIG. 1; and, FIG. 3 is a plot of simulated differential response for various damper configurations with a 6-cylinder diesel engine.

FIG. 2 is a top half of a torque converter cross section depicting an embodiment of the damper configuration in FIG. 1.

Figure 3:
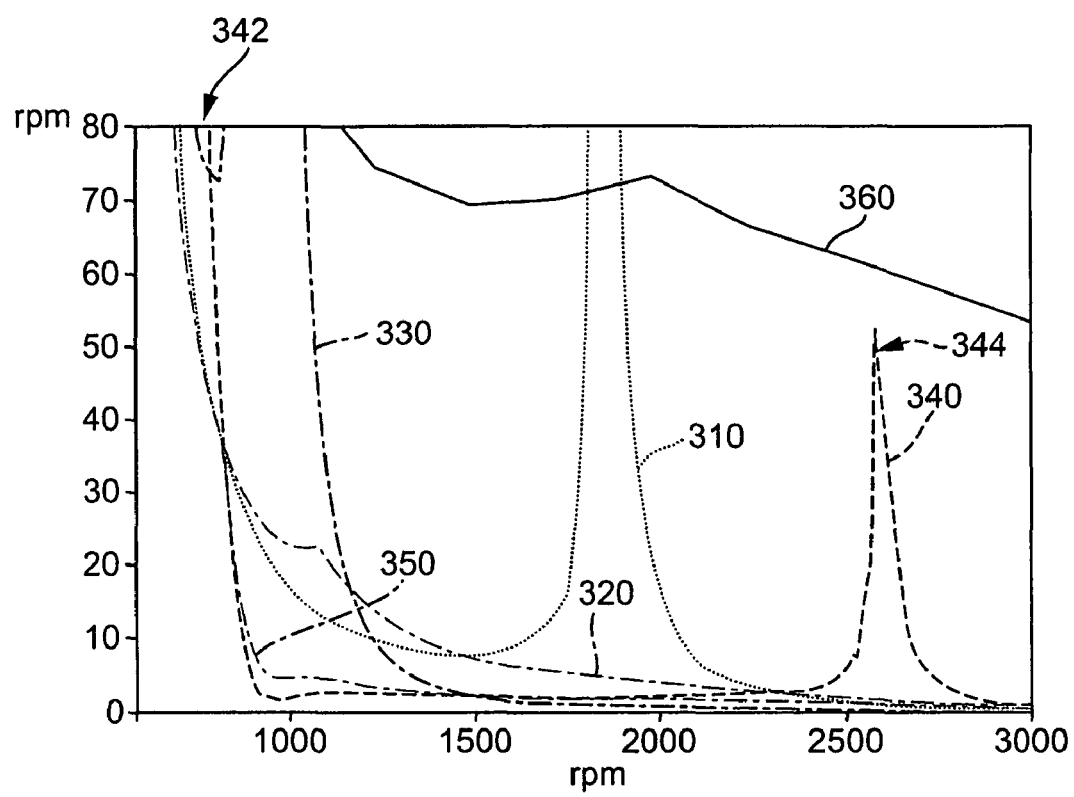

FIG. 3 is a plot of simulated differential response for various damper configurations in combination with a 6-cylinder diesel engine, though other engine configurations (4-cylinder, 5-cylinder, 8-cylinder, gasoline, etc.) and speeds are possible. The following should be viewed in light of FIGS. 1 through 3. In FIG. 1, inertias are depicted as blocks, though the relative size of the blocks does not necessarily relate to the component inertias. Engine 101 is rigidly coupled to torque converter housing 102. Torque converter clutch 104 and fluid circuit 106 are shown schematically as parallel torque paths extending from housing 102. Clutch 104 couples piston plate 108 to housing 102 when engaged. Spring 110 couples floating flange 112 to piston plate 108 with torsional resilience. Likewise, spring 114 resiliently couples output hub 116 to flange 112. Generally, minimizing friction between piston 108, flange 112, and hub 116 improves isolator performance. In the parallel path, inertia element 118 is coupled to flange 112 by resilient element 120 and damping element 122. Element 122 can be any damping element known in the art, for example, a frictional element or a hydraulic element. Element 120 can be any resilient element known in the art. In the discussion that follows, a spring is used for the resilient element. In a preferred embodiment, inertia element 118 is a turbine of fluid circuit 106. Other embodiments (not shown) include an additional inertia element, in which case symbolic connection 124 between inertia 118 and fluid circuit 106 is eliminated.

Element 126 limits compression of element 120 and motion of damper 122. When clutch 104 is engaged, force stored in element 120 is generally far less than a driving force of engine 100. However, when clutch 104 is not engaged, fluid circuit 106 transmits torque from engine 101 through link 124 into inertia 118 and element 120. Travel stop 126 limits amount of force exerted on element 120 for improved durability.

Spring 120 is designed to shift the resonance of the turbine to a point just below the lowest engine speed where the clutch will be engaged. The lowest engine speed where the clutch is engaged may be referred to as the lugging limit. For example, desired turbine resonance may be 955 RPM (47.75 Hz for a 6-cylinder engine), assuming a lugging limit of 1000 RPM. The spring rate can be calculated using the equation $$k = 4J\pi^2 f^2$$

where J is the turbine inertia of 0.035 kg·m² and f is the tuning frequency of 47.75 Hz. So, for this example, spring rate k should be designed to 3150.5 Nm/rad (55 Nm/deg) for a lugging limit of 1000 RPM.

Spring 120 introduces an additional degree of freedom into the vibration system, splitting the floating flange resonance into two resonances. Tuning of spring 120 shifts the lower resonance out of the normal driving range, but the higher resonance may still be in the normal driving range, for example, as shown for line 340 in FIG. 3. Damping element 122 is designed to damp the higher resonance. Friction damping is generally used for element 122, though other types of damping (fluid, rubber, etc.) may be used. Friction values of 5 Nm-20 Nm are typical, with diesel engines requiring more friction than gas engines due to increased torque fluctuations. Element 122 damps the higher resonance without significantly degrading isolator performance at other frequencies, for example, as shown for line 350 in FIG. 3.

In FIG. 2, torque converter assembly 200 includes pump 202 and cover 204 (analogous to cover 102 in FIG. 1). Cover 204 is attached to flexplate 206 with lugs 208. Flexplate 206 receives torque from an engine (not shown) through attachment with fasteners 210. Torque from pump 202 is transmitted to turbine 212 and reacted by stator 214. Converter 200 also includes damper 216. Turbine torque is transmitted through damper 216 to input shaft 218. Clutch 220 bypasses fluid circuit created by pump 202, turbine 212, and stator 214, for improved fuel economy. That is, clutch 220 directly connects cover 204 to the damper.

Damper 216 comprises damper stage 222 (analogous to 110 in FIG. 1), damper stage 224 (analogous to 114 in FIG. 1) and floating flange 226 (analogous to flange 112 in FIG. 1) torsionally connecting stages 222 and 224. By torsionally connecting, we mean that torque received by stage 222 is transmitted to stage 224, and vice versa, by the flange. In a preferred embodiment, floating flange 226 includes cover plate 228 and cover plate 230. In another embodiment, damper stage 222 is a radially outer damper stage and damper stage 224 is a radially inner damper stage. In a further embodiment, stages 222 and 224 are located axially adjacent at a similar radius.

Damper 216 includes tuned torsion damper 232 (analogous to element 120 in FIG. 1) torsionally connecting turbine 212 and flange 226. Although turbine 212 is shown, damper 232 may torsionally connect any inertia element that is rotationally free when clutch 104 is engaged. In a preferred embodiment, damper 232 includes any elastic member known in the art with a linear zero torque transition. That is, when cycled from positive torque to negative torque, the spring rate through zero is linear. Alternatively stated, the transition through zero torque is linear when torsional windup of damper 232 is changed from a first rotational direction to a second, opposite, rotational direction.

In another embodiment (not shown), damper 232 includes a coil spring. In a further embodiment (not shown), damper 232 includes a torsionally elastic plate. The torsionally elastic plate may comprise annular rings for attachment with turbine 212 and flange 226 and thin legs connecting the rings while allowing torsional windup. In another embodiment (not shown), the legs are integral and form an s-curve, similar to the device described in commonly assigned U.S. Pat. App. No. 60/876,317 (provisional applied for Dec. 21, 2006 by Kneidel and Schroeder for "LASH PREVENTION SPRING PLATE"), herein incorporated by reference. In a preferred embodiment (not shown), damper 232 is rigidly fixed to turbine 212 and flange 226, for example, by rivets 234 and 236, respectively.

Damper 232 and flange 226 may include axial offset 238 between attachment locations. Offset in damper 232 is less than offset in flange 226 in a free state, that is, the flange is further to the left in FIG. 2 than the damper. Offset in damper 232 is greater in order for mounting locations to lie adjacent the mounting locations of flange 226 so that rivet 236 may be installed. In a preferred embodiment, cover plate 228 includes the portion of flange 226 with offset 238. In a preferred embodiment, force of damper 232 on flange 226 in direction 239 generates friction (analogous to cover 122 in FIG. 1) to damp torsional fluctuations when damper 232 is rotated.

In a preferred embodiment, windup travel is limited by lash connection 240 (analogous to element 126 in FIG. 1), including spacer rivet 234 and slot 242 in flange 226. Therefore, turbine 212 and damper 232 can rotate a predetermined angular distance before engaging flange 226. In a preferred embodiment, the predetermined distance is between 2 degrees and 20 degrees. More specifically, the distance may be limited to between 6 degrees and 10 degrees. In another embodiment (not shown), total windup travel of torsion damper 232 is limited by a spline connection with lash.

In lockup mode, engine torque is transmitted to cover 204 through flexplate 206. Piston plate 244 receives torque from cover 204 through leaf spring 246. Piston 244 is sealed to input shaft 218 with seal 248, allowing piston 244 to close clutch 220 and transmit torque to plate 250 when fluid pressure in chamber 251 is sufficiently high. Plate 250 transmits torque to cover plate 252 through spline connection 254. Rivet 256 connects cover plate 252 to cover plate 258. Plates 252 and 258 drive spring 260, which applies torque to floating flange 226. Plates 228 and 230 of flange 226 compress spring 262 which drives input shaft 218 through spline connection 264 on output flange 266.

As described supra, torsion damper 232 allows inertia of turbine 212 to swing relative to flange 226. Damper 232 and turbine 212 are riveted to turbine hub 268. Hole 270 in flange 266 provides clearance for riveting tooling to upset rivet 234. Enlarged head portion 272 of rivet 234 prevents cover plate 228 from axially displacing, while still allowing plate 228 to displace rotationally during windup of torsion damper 232. Hub 268 is centered on flange 266.

Bearings 274 and 276 control axial displacement of components in converter 200. Spline connection 254 limits axial travel of plate 252. Riveted connection 256 controls axial location of plate 228, and turbine 212 and hub 268 through rivet 234. Shoulder 278 controls axial displacement of flange 266 relative to hub 268.

In FIG. 3, the abscissa is engine speed and the ordinate is peak-to-peak speed fluctuations of the differential. Alternatively stated, the response of the differential as measured by peak-to-peak speed fluctuations are plotted against engine speed for various damper configurations. A typical diesel engine may operate between 800 RPM and 3500 RPM, with the torque converter clutch engaged at engine speeds as low as 1000 RPM. Higher peak-to-peak fluctuations are more likely to cause objectionable vibrations and discomfort to the driver.

Dotted line 310 depicts the differential response for a drivetrain incorporating a series turbine damper without friction. As discussed supra, line 310 exhibits a resonance at approximately 1900 RPM, due in part to inertia of the floating flange. Dash-dash-dot line 320 depicts the response when friction is added to the damper of line 310. Although the peak at 1900 RPM is eliminated, isolation at engine speeds above and below the resonance point is reduced, as evidenced by higher fluctuations. For example, line 320 is above line 310 for rpm values less than approximately 1,500 and greater than approximately 2,500.

Dash-dot-dot line 330 depicts the response of a drivetrain with a double damper configuration. Additional turbine inertia results in a lower resonance point than the series turbine damper (approximately 1000 RPM), but the resonance is still in the typical operating range for this engine and would result in objectionable vibrations.

Dashed line 340 depicts the response of a drivetrain with a present invention "turbine tilger" damper configuration without friction. In this example, the turbine tilger is tuned to 955 RPM. Here, the floating flange resonance of the series turbine damper is split into two resonance points. Lower resonance point 342 is located at an engine speed of about 750 RPM, below the typical driving range. Resonance point 344 is located at an engine speed of about 2600 RPM. Point 344 is still in the driving range for this engine and drivetrain configuration, but can be reduced significantly when friction is added as shown in dash-dot line 350. Damping friction results in a slight reduction in isolator performance at low speeds but eliminates the resonance at point 344. Overall, the performance of the turbine tilger in line 350 is a significant improvement over the series turbine damper and double damper designs within the typical lockup speeds of 1000 RPM to 3500 RPM. The turbine tilger shows considerable isolation of the differential over engine firing fluctuations depicted by solid line 360.

The present invention also includes a method of operating a torque converter. Although the method is described as a sequence of steps for clarity, no order should be inferred from the sequence unless explicitly stated. A first step receives a torque into a first damper stage. A second step transmits the torque from the first damper stage to a floating flange. A third step transmits the torque from the floating flange to a second damper stage. A fourth step connects an inertia element to the flange through a tuned torsion damper to suppress a resonance of the flange.

In one embodiment, a fifth step tunes the torsion damper to reduce a high frequency peak by adjusting a spring rate and a friction of said damper with the flange. In another embodiment, the friction is between 5 Nm and 20 Nm or the spring rate is calculated to move a resonance of the inertia element to a point below a lugging limit. In one embodiment, the inertia element is a turbine of the torque converter. In another embodiment, a total rotational travel of the torsion damper is between 2 degrees and 20 degrees. In a further embodiment, the travel is between 6 degrees and 10 degrees.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What we claim is:

1. A torque converter comprising:
a first damper stage;
a second damper stage;
a floating flange torsionally connecting said first and second damper stages;
an inertia element; and
a tuned torsion damper, wherein said torsion damper connects said inertia element and said flange.

2. The torque converter of claim 1, wherein said inertia element is a turbine.

3. The torque converter of claim 1, wherein said first damper stage is a radially outer damper stage and said second damper stage is a radially inner damper stage.

4. The torque converter of claim 1, wherein said torsion damper generates a friction torque when rotated.

5. The torque converter of claim 1, wherein said torsion damper comprises an elastic member with a linear zero torque transition.

6. The torque converter of claim 5, wherein said elastic member comprises a torsionally elastic plate.

7. The torque converter of claim 6, wherein said plate is rigidly connected to said flange and said turbine element.

8. The torque converter of claim 6, wherein said plate further comprises an axial offset, said flange further comprises an axial offset, and said plate offset is less than said flange offset.

9. The torque converter of claim 5, wherein said elastic member comprises a coil spring.

10. The torque converter of claim 1, wherein a total rotational travel of said torsion damper is between 2 degrees and 20 degrees.

11. The torque converter of claim 10, wherein said travel is between 6 degrees and 10 degrees.

12. The torque converter of claim 11, wherein the total rotational travel of said torsion damper is limited by a connection with lash between said inertial element and said flange.

13. The torque converter of claim 12, wherein said lash connection comprises a rivet disposed in a slot in said flange.

14. The torque converter of claim 12, wherein said lash connection comprises a spline connection.

15. A torque converter comprising:
a radially outer first damper stage;
a radially inner second damper stage;
a floating flange with a first axially offset portion, said flange torsionally connecting said first and second damper stages;
a turbine; and
a torsionally elastic plate with a linear zero torque transition and a second axially offset portion rigidly connected to said turbine and said flange, wherein said first offset portion is more axially offset than said second offset portion and wherein contact between said first and second offset portions generates a friction torque when said torsion damper is rotated.

16. A method of operating a torque converter comprising the steps of:
receiving a torque into a first damper stage;
transmitting said torque from said first damper stage to a floating flange;
transmitting said torque from said floating flange to a second damper stage; and,
connecting an inertia element to the flange through a tuned torsion damper to suppress a resonance of said flange.

17. The method of claim 16, further comprising the step of tuning said torsion damper to reduce a high frequency peak by adjusting a spring rate and a friction of said damper with the flange.

18. The method of claim 17, wherein said friction is between 5 Nm and 20 Nm.

19. The method of claim 17, wherein said spring rate is calculated to move a resonance of said inertia element to a point below a lugging limit.

20. The method of claim 16, wherein said inertia element is a turbine of said torque converter.

21. The method of claim 16, wherein a total rotational travel of said torsion damper is between 2 degrees and 20 degrees.

22. The method of claim 19, wherein said travel is between 6 degrees and 10 degrees.

* * * * *